United States Patent
Jarng (10) Patent No.: US 11,979,512 B2
(45) Date of Patent: May 7, 2024

(54) MOBILE TERMINAL HAVING HEARING AID FUNCTION, AND EARPHONE-BASED HEARING AID SYSTEM USING THE SAME

(71) Applicant: ALGORKOREA CO. LTD, Seoul (KR)

(72) Inventor: Dongsoo Jarng, Seoul (KR)

(73) Assignee: ALGORKOREA CO. LTD., Seoul (KR)

( * ) Notice: Subject to any disclaimer, the term of this patent is extended or adjusted under 35 U.S.C. 154(b) by 176 days.

(21) Appl. No.: 17/629,226

(22) PCT Filed: Jul. 22, 2019

(86) PCT No.: PCT/KR2019/009025
§ 371 (c)(1),
(2) Date: Jan. 21, 2022

(87) PCT Pub. No.: WO2021/015315
PCT Pub. Date: Jan. 28, 2021

(65) Prior Publication Data
US 2022/0321689 A1 Oct. 6, 2022

(51) Int. Cl.
*H04M 1/60* (2006.01)
*H04R 1/10* (2006.01)
*H04R 25/00* (2006.01)

(52) U.S. Cl.
CPC ........ *H04M 1/6058* (2013.01); *H04R 1/1083* (2013.01); *H04R 25/70* (2013.01); *H04R 2201/107* (2013.01)

(58) Field of Classification Search
CPC ... H04M 1/6058; H04R 1/1083; H04R 25/70; H04R 25/305; H04R 2201/107
See application file for complete search history.

(56) References Cited

U.S. PATENT DOCUMENTS

| 2016/0255447 | A1 | 9/2016 | Kim et al. |
| 2017/0164124 | A1 | 6/2017 | Shennib |
| 2019/0090073 | A1* | 3/2019 | Wendt ................ A61B 5/125 |
| 2019/0349691 | A1* | 11/2019 | Ungstrup ........... H04M 1/6066 |

FOREIGN PATENT DOCUMENTS

| KR | 10-1381021 B1 | 4/2014 | |
| KR | 101381021 B1 * | 4/2014 | ............ H04R 25/00 |
| KR | 10-2015-0117380 A | 10/2015 | |
| KR | 10-2017-0009062 A | 1/2017 | |

OTHER PUBLICATIONS

English machine translation of KR 10-1381021 (Min et al., System and Method for Self-Fitting Hearing Aid Using Mobile Terminal, published Apr. 2014) (Year: 2014).*
International Search Report for PCT/KR2019/009025 dated Jul. 6, 2020.

* cited by examiner

*Primary Examiner* — Mark Fischer
(74) *Attorney, Agent, or Firm* — The PL Law Group, PLLC

(57) ABSTRACT

A mobile terminal according to an embodiment of the present disclosure includes a microphone configured to obtain and provide an input sound source, an earphone connection module configured to support connection and communication with an earphone, and a hearing aid application configured to set a sound source fitting condition corresponding to a user hearing threshold, convert the input sound source obtained through the microphone into a corrected sound source according to the sound source fitting condition, and then output the corrected sound source to the earphone.

6 Claims, 9 Drawing Sheets

MOBILE TERMINAL HAVING HEARING AID FUNCTION, AND EARPHONE-BASED HEARING AID SYSTEM USING THE SAME

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2019/009025, filed Jul. 22, 2019, the entire contents of which are incorporated herein by reference.

BACKGROUND

1. Technical Field

The present disclosure relates to a mobile terminal having a hearing aid function, which may replace a hearing aid through a combination of the mobile terminal and an earphone, and an earphone-based hearing aid system using the same.

2. Background Art

A hearing aid is a device that is mounted in the ear of a patient diagnosed with hearing loss in a hearing test and amplifies sound and assists the patient's hearing loss. A hearing aid includes a sound source inputter configured to receive sound, an amplifier configured to amplify the sound, and a speaker configured to output the amplified sound, and operates according to each hearing-impaired person's hearing ability at each frequency.

However, because such a hearing aid is implemented as a personalized device based on a hearing test result and individual characteristics, the cost of implementing the hearing aid is relatively high.

However, a mobile terminal such as a smartphone or a tablet personal computer (PC) includes all elements required to operate a hearing aid, including a microphone, a speaker, an audio codec chip having both audio input/output signal processing functions, and an application processor (AP) chip including a central processing unit (CPU) and a graphics processing unit (GPU).

Accordingly, there is an increasing demand for replacing a hearing aid function by using resources provided in a mobile terminal.

SUMMARY

In order to solve the problems, the present disclosure provides a mobile terminal having a hearing aid function which enables the mobile terminal to perform a hearing aid function, thereby replacing a conventional hearing aid through the mobile terminal and an earphone connected to the mobile phone, and an earphone-based hearing aid system using the mobile terminal.

Objectives of the present disclosure are not limited thereto, and other unmentioned objectives will be clearly understood by one of ordinary skill in the art to which the present disclosure pertains from the following description.

As a means for solving the problems, according to an embodiment of the present disclosure, a mobile terminal having a hearing aid function includes: a microphone configured to obtain and provide an input sound source; an earphone connection module configured to support connection and communication with an earphone; and a hearing aid application configured to set a sound source fitting condition corresponding to a user hearing threshold, convert the input sound source obtained through the microphone into a corrected sound source according to the sound source fitting condition, and then output the corrected sound source to the earphone.

The hearing aid application may include: an earphone connection detector configured to detect and notify whether the earphone is connected; a hearing threshold setter configured to determine a hearing threshold by tracking and monitoring a user response while varying a sound pressure for each frequency channel of a hearing test sound; a sound source fitter configured to calculate and store a user-customized fitting condition corresponding to the hearing threshold, divide the input sound source into n frequency channels, and generate and output the corrected sound source by nonlinearly compressing and amplifying each of the n frequency channels according to the user-customized fitting condition; an ambient noise canceler configured to remove ambient noise included in the input sound source; and a feedback canceler configured to remove feedback noise included in the input sound source.

The hearing threshold setter may be further configured to receive and store a hearing threshold manually input from a user.

The sound source fitter may be further configured to pre-set and store a plurality of fitting conditions having pre-set values, and then generate and output the corrected sound source through any one of the plurality of fitting conditions with a user's consent.

The hearing threshold setter may be further configured to identify a user situation by interoperating with a mobile sensor, and then obtain and set a hearing threshold corresponding to each user situation.

The sound source fitter may be further configured to obtain and store a sound source fitting condition for each situation based on the hearing threshold corresponding to each user situation, automatically identify a user situation by interoperating with the mobile sensor, and then generate and provide the corrected sound source by automatically selecting and applying a sound source fitting condition corresponding to the user situation.

As a means for solving the problems, according to another embodiment of the present disclosure, an earphone-based hearing aid system includes: an earphone; and a mobile terminal comprising a hearing aid application installed and executed to set a sound source fitting condition corresponding to a user hearing threshold, convert an input sound source obtained through a microphone into a corrected sound source according to the sound source fitting condition, and output the corrected sound source to the earphone.

According to the present disclosure, because a mobile terminal may perform a hearing aid function, a conventional hearing aid may be replaced through the mobile terminal and an earphone connected to the mobile terminal. Accordingly, a hearing loss problem may be solved with minimal cost and effort.

Also, according to the present disclosure, because a user situation may be automatically identified by using mobile resources and a sound source fitting condition may be set and applied for each user situation by using the automatically identified user situation, a user may be additionally provided with a corrected sound source optimized for a current situation.

DETAILED DESCRIPTION

The following description illustrates only a principle of the present disclosure. Therefore, one of ordinary skill in the art may implement the principle of the present disclosure and invent various devices included in the spirit and scope of the present disclosure although not clearly described or shown in the present specification. In addition, it is to be understood that all conditional terms and exemplary embodiments mentioned in the present specification are basically intended only to allow one of ordinary skill in the art to understand a concept of the present disclosure, and the present disclosure is not limited to exemplary embodiments and states particularly mentioned as such.

Further, it is to be understood that all detailed descriptions mentioning a specific exemplary embodiment of the present disclosure as well as principles, aspects, and exemplary embodiments of the present disclosure are intended to include structural and functional equivalences thereof. Further, it is to be understood that these equivalences include an equivalence that will be developed in the future as well as an equivalence that is current well-known, that is, all devices invented so as to perform the same function regardless of a structure.

Therefore, it is to be understood that, for example, a block diagram of the present specification shows an illustrative conceptual aspect for embodying a principle of the present disclosure. Similarly, it is to be understood that all flowcharts, state transition diagrams, pseudo-code, and the like, show various processes that may be tangibly embodied in a computer-readable medium and that are executed by computers or processors regardless of whether or not the computers or the processors are clearly shown.

Functions of various devices including processors or functional blocks represented as concepts similar to the processors and shown in the accompanying drawings may be provided by hardware having capability to execute appropriate software as well as dedicated hardware. When the functions are provided by the processors, they may be provided by a single dedicated processor, a single shared processor, or a plurality of individual processors and some of them may be shared.

In addition, terms mentioned as a processor, a control, or a concept similar to the processor or the control should not be interpreted to exclusively cite hardware having capability to execute software, but should be interpreted to implicitly include digital signal processor (DSP) hardware and a read-only memory (ROM), a random-access memory (RAM), and a non-volatile memory for storing software without being limited thereto. The above-mentioned terms may also include well-known other hardware.

In the claims of the present specification, components represented as means for performing functions mentioned in the detailed description are intended to include all methods for performing functions including all types of software including, for example, a combination of circuit devices performing these functions, firmware/micro code, or the like, and are coupled to appropriate circuits for executing the software so as to execute these functions. It is to be understood that because functions provided by variously mentioned means are combined with each other and are combined with a scheme demanded by the claims in the present disclosures defined by the claims, any means capable of providing these functions are equivalent to means recognized from the present specification.

The above-mentioned objects, features, and advantages will become more obvious from the following detailed description provided in relation to the accompanying drawings. Therefore, one of ordinary skill in the art to which the present disclosure pertains may easily practice a technical idea of the present disclosure. Further, in describing the present disclosure, in the case in which it is judged that a detailed description of a well-known technology associated with the present disclosure may unnecessarily make the gist of the present disclosure unclear, it will be omitted.

Figure 1:
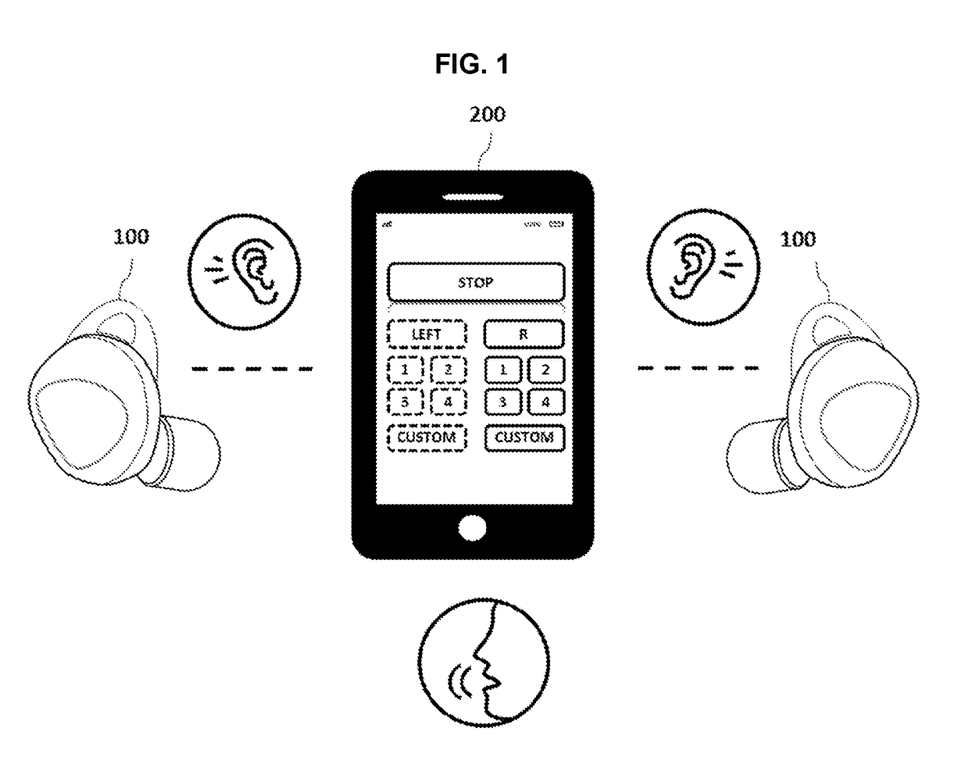
FIG. 1 is a view for describing an earphone-based hearing aid system, according to an embodiment of the present disclosure.

FIG. 1 is a view for describing an earphone-based hearing aid system, according to an embodiment of the present disclosure.

As shown in FIG. 1, a system of the present disclosure includes an earphone 100, and a mobile terminal 200 configured to determine a fitting condition for each frequency channel by measuring a hearing threshold of a user, convert an input sound source into a corrected sound source according to the fitting condition for each frequency channel, and then output the corrected sound source by wire or wirelessly to the earphone 100.

In particular, the mobile terminal 200 of the present disclosure may install and execute a hearing aid application having a hearing function, and thus, may generate and provide a corrected sound source optimized for a user's hearing ability through a combination of the mobile terminal 200 and the earphone 100 that is commercially available, without adding a separate hardware device.

Figure 2:
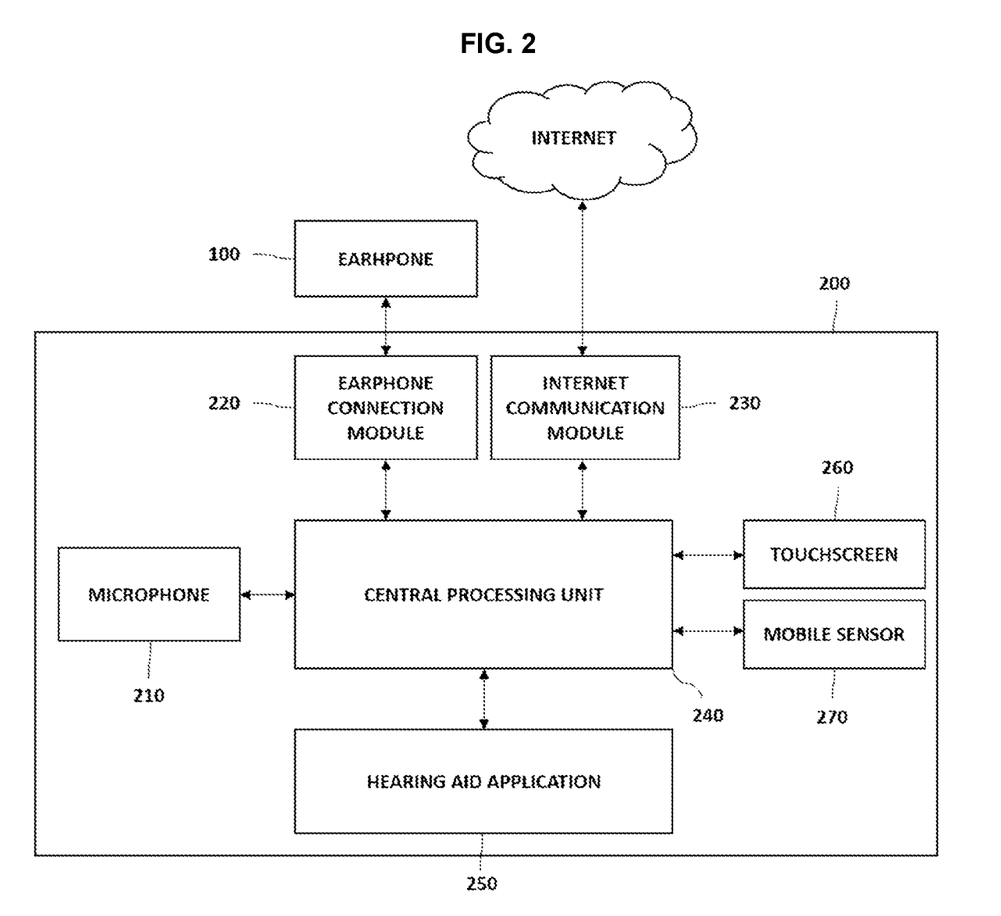
FIG. 2 is a diagram illustrating a detailed configuration of a mobile terminal, according to an embodiment of the present disclosure.

FIG. 2 is a diagram illustrating a detailed configuration of a mobile terminal, according to an embodiment of the present disclosure.

As shown in FIG. 2, the mobile terminal 200 of the present disclosure includes a microphone 210, an earphone connection module 220, an Internet communication module 230, and a central processing unit 240, and further includes a hearing aid application 250 that is downloaded, installed, and executed by the central processing unit 240.

The microphone 210 obtains and outputs an input sound source corresponding to an external sound or a mobile output sound.

The earphone connection module 220 includes at least one of an audio jack, a data terminal, and a Bluetooth Internet communication module, and may support connection and communication with the earphone 100, to transmit a corrected sound source obtained through the hearing aid application 250 to the earphone 100 by wire or wirelessly.

The internet communication module 230 may access the Internet by using a mobile communication method or the like, may search and view various data uploaded to the Internet, and may download or upload data.

The central processing unit 240 controls an overall operation of the mobile terminal, and in particular, downloads, installs, and executes the hearing aid application 250 at a user's request, and then associates the hearing aid application 250 with operations of mobile internal resources.

The hearing aid application 250 that is an application having a hearing aid function converts an input sound source into a corrected sound source according to a pre-set fitting condition or a fitting condition corresponding to a user hearing threshold, and then outputs the corrected sound source to the earphone 100. That is, the hearing aid application may combine the earphone that is commercially available with the mobile terminal, to provide a corrected sound source optimized to the user hearing threshold.

In addition, the mobile terminal of the present disclosure may basically include therein a touchscreen 260 that displays a graphic user interface (GUI) of the hearing aid application 250 under the control of the central processing unit 240 and obtains and outputs various user control values through the GUI, and a mobile sensor 270 that includes a position tracking device, an illuminance sensor, and a motion sensor, and senses and notifies a user position, a user ambient illuminance, and a user motion through the sensors.

Figure 3:
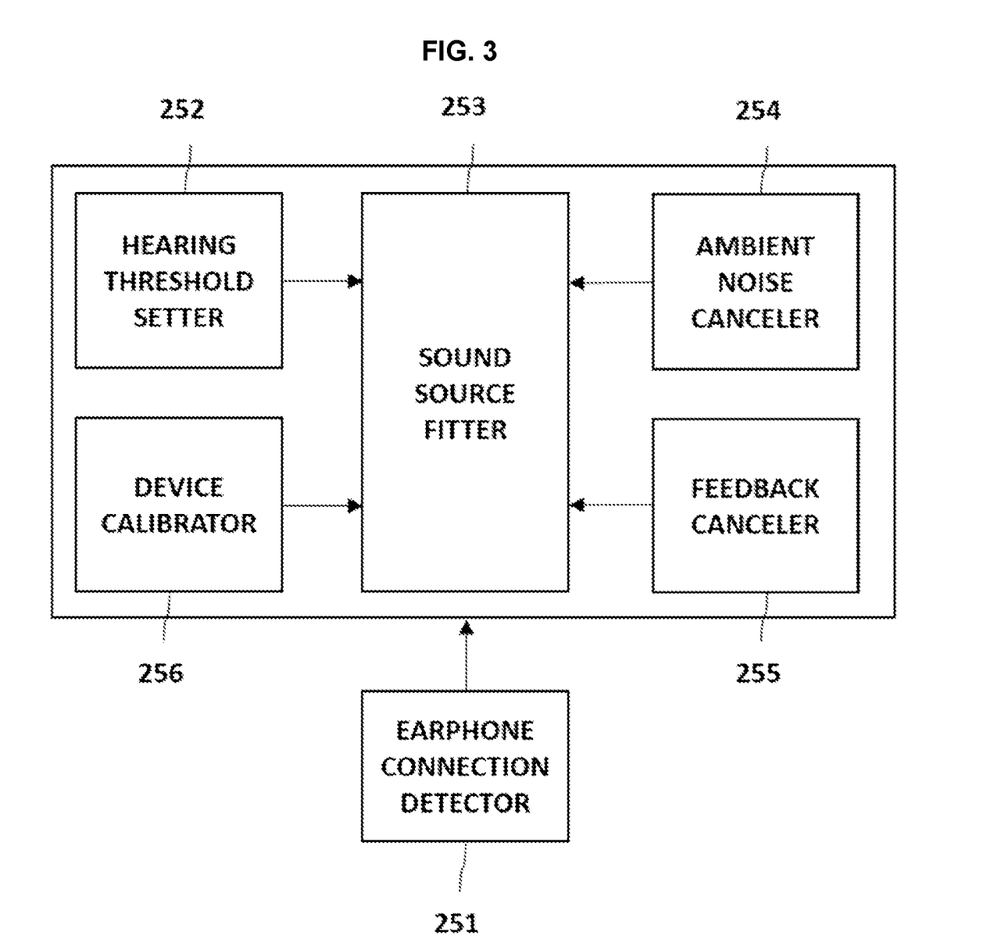
FIG. 3 is a diagram illustrating a detailed configuration of a hearing aid application, according to an embodiment of the present disclosure.

FIG. 3 is a diagram illustrating a detailed configuration of a hearing aid application, according to an embodiment of the present disclosure.

Referring to FIG. 3, the hearing aid application 250 of the present disclosure includes an earphone connection detector 251, a hearing threshold setter 252, a sound source fitter 253, an ambient noise canceler 254, a feedback canceler 255, and a device calibrator 256.

The earphone connection detector 251 detects whether an earphone is connected to the earphone connection module 220, and allows a hearing aid function to be performed only when the earphone is connected.

The hearing threshold setter 252 may allow a user to set an optimal sound pressure for each frequency band by directly adjusting a sound pressure and a frequency band of a hearing test sound, and calculate and store a user hearing threshold based on the optimal sound pressure for each frequency band. That is, through a hearing test operation, the hearing threshold setter 252 may allow the user himself/herself to measure and set the hearing threshold that may be heard by the user.

When the user already knows his/her hearing threshold, the hearing threshold setter 252 may allow the user to directly input and set the hearing threshold without performing a hearing test.

The sound source fitter 253 calculates and stores a user-customized fitting condition based on the hearing threshold recognized through the hearing threshold setter 252. The sound source fitter 253 divides an input sound source obtained through the microphone 210 that is a sound source inputter into n frequency channels, and then generates and outputs a corrected sound source by nonlinearly compressing and amplifying each of the n frequency channels according to the user-customized fitting condition.

In addition, the sound source fitter 252 may pre-set or store a plurality of fitting conditions having pre-set values, so that the user selects any one of the plurality of fitting conditions and generates and outputs a corrected sound source under the pre-set fitting condition. In this case, the plurality of fitting conditions may be sub-divided according to various criteria, for example, a volume and a user situation.

The ambient noise canceler 254 removes ambient noise included in the input sound source through an adaptive noise cancellation algorithm or a noise reduction filter, and the feedback canceler 255 removes feedback noise included in the input sound source through a feedback cancellation algorithm.

Figure 4:
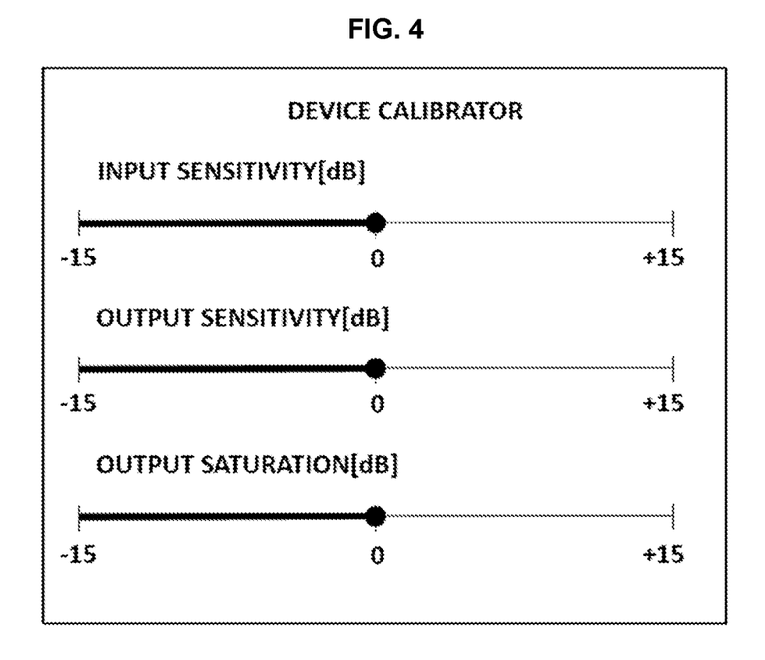
FIG. 4 is a diagram for describing a device calibration operation of a hearing aid application, according to an embodiment of the present disclosure.

The device calibrator 256 calculates a sound source input (or microphone) sensitivity, a sound source output (or earphone) sensitivity, and a sound source saturation within pre-set ranges (e.g., +/−15 dB) at the user's request, as shown in FIG. 4, and provides a calibration result to the sound source fitter 253. Accordingly, the sound source fitter 253 may perform the above-described sound source fitting operation by additionally adjusting the sound source input/output sensitivities and the sound source output saturation by reflecting the calibration result.

Also, the user may additionally perform a device calibration operation while performing a hearing threshold setting operation. The hearing threshold setter 252 provides the hearing threshold and the calibration result together to the sound source fitter 253, and the sound source fitter 253 adjusts the sound source input/output sensitivities and the sound source output saturation according the calibration result, and then performs a sound source fitting operation by setting and applying a user-customized fitting condition corresponding to the hearing threshold. That is, the sound source fitting operation corresponding to the user hearing threshold may be performed under a user setting situation.

An operation of the present disclosure will now be described with reference to FIGS. 5 through 9.

Figure 5:
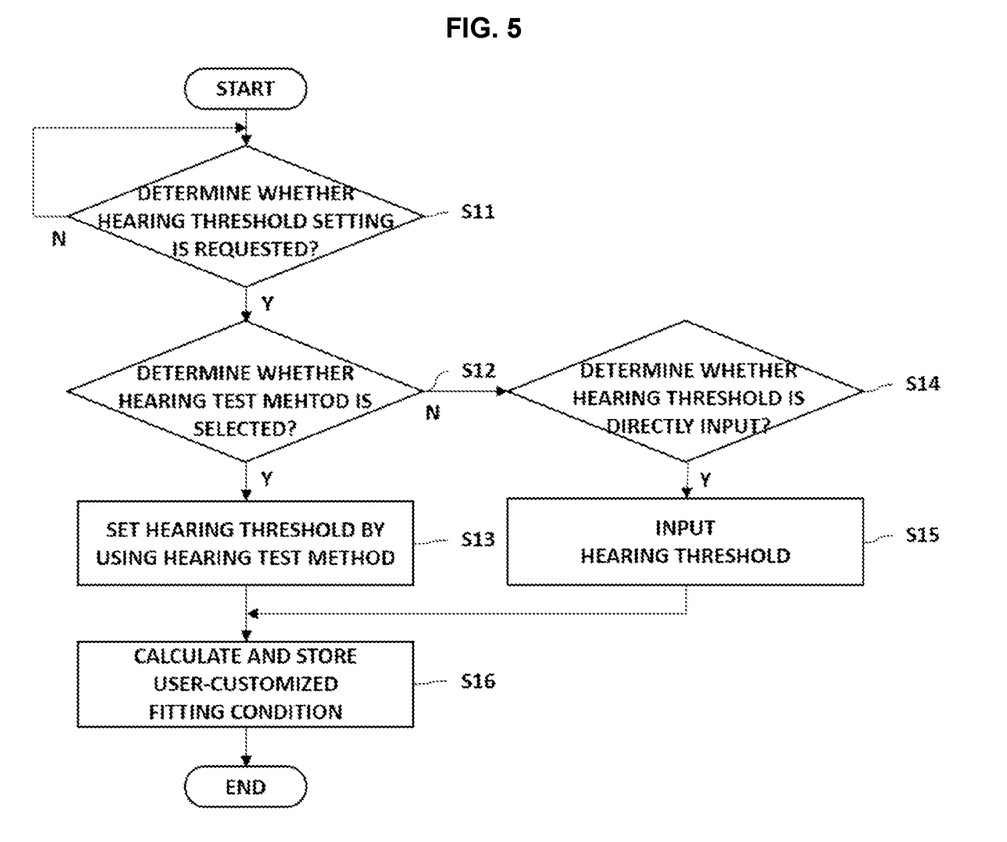
FIGS. 5 and 6 are diagrams for describing a method of setting a hearing threshold, according to an embodiment of the present disclosure.
Figure 6:
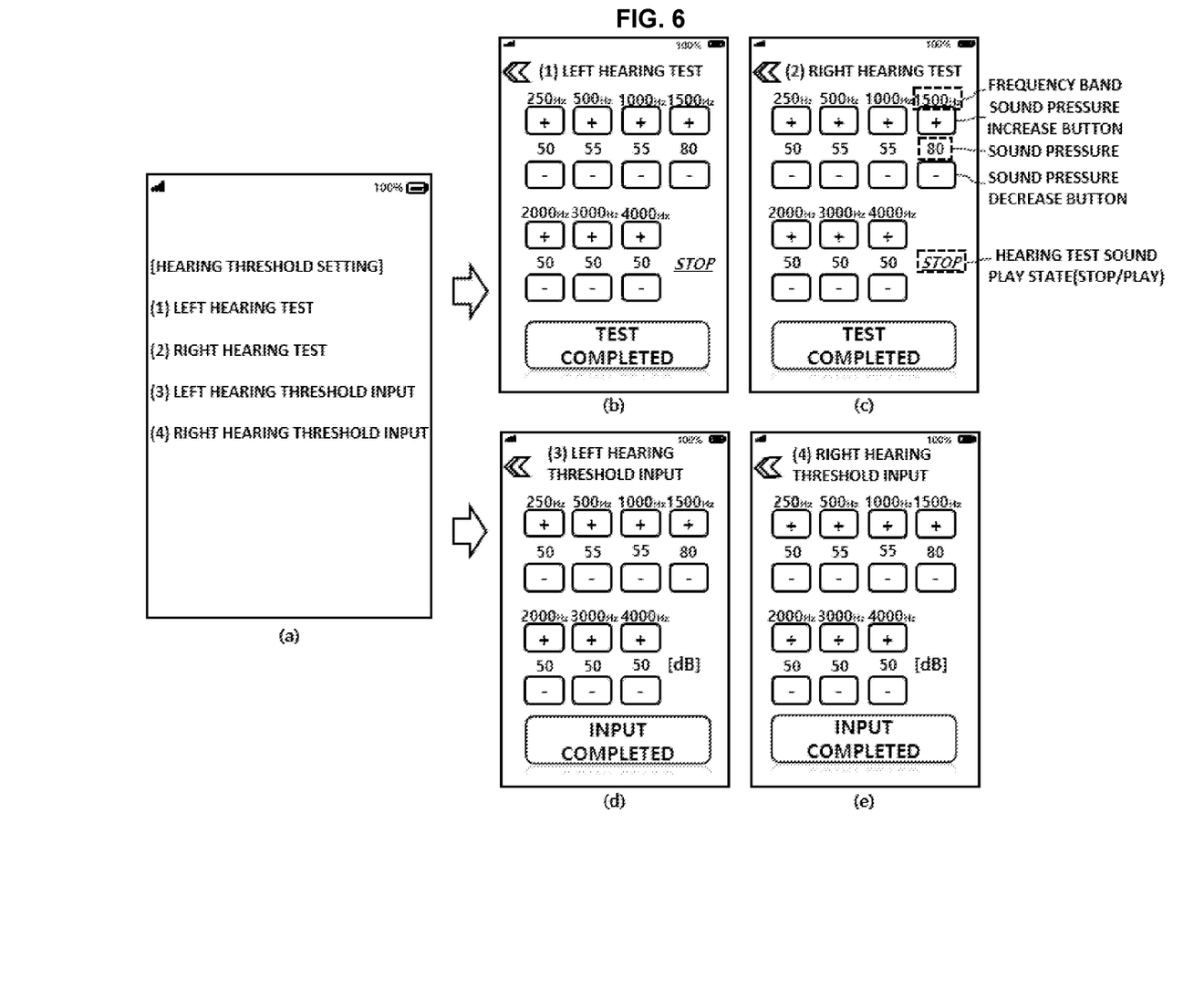

FIGS. 5 and 6 are diagrams for describing a method of setting a hearing threshold, according to an embodiment of the present disclosure.

First, when a user requests hearing threshold setting (S11), a user is asked about a hearing threshold setting target and setting method through a screen as shown in (a) of FIG. 6.

When the user requests a hearing test of the left ear or the right ear (S12), a hearing test screen may be configured and provided as shown in (b) and (c) of FIG. 6, so that the user identifies and sets an appropriate sound pressure (i.e., hearing threshold) for each frequency band while adjusting a sound pressure for each frequency band of a hearing test sound by using a [+]/[−] button (S13).

In contrast, when the user requests a direct input of a hearing threshold of the left ear or the right ear (S14), a hearing input screen may be configured and provided as shown in (d) and (e) of FIG. 6, so that the user directly inputs and sets a hearing threshold which the user knows by using a [+]/[−] button (S15).

When both hearing thresholds of the left ear and the right ear are obtained through operation S13 or S15, the sound source fitter 253 calculates and stores a user-customized fitting condition corresponding to each of the left ear and the right ear by reflecting the hearing thresholds (S16).

Although an operation of setting a hearing threshold is performed on each of the left ear and the right ear, the operation may be commonly performed on the left ear and the right ear when necessary.

Figure 7:
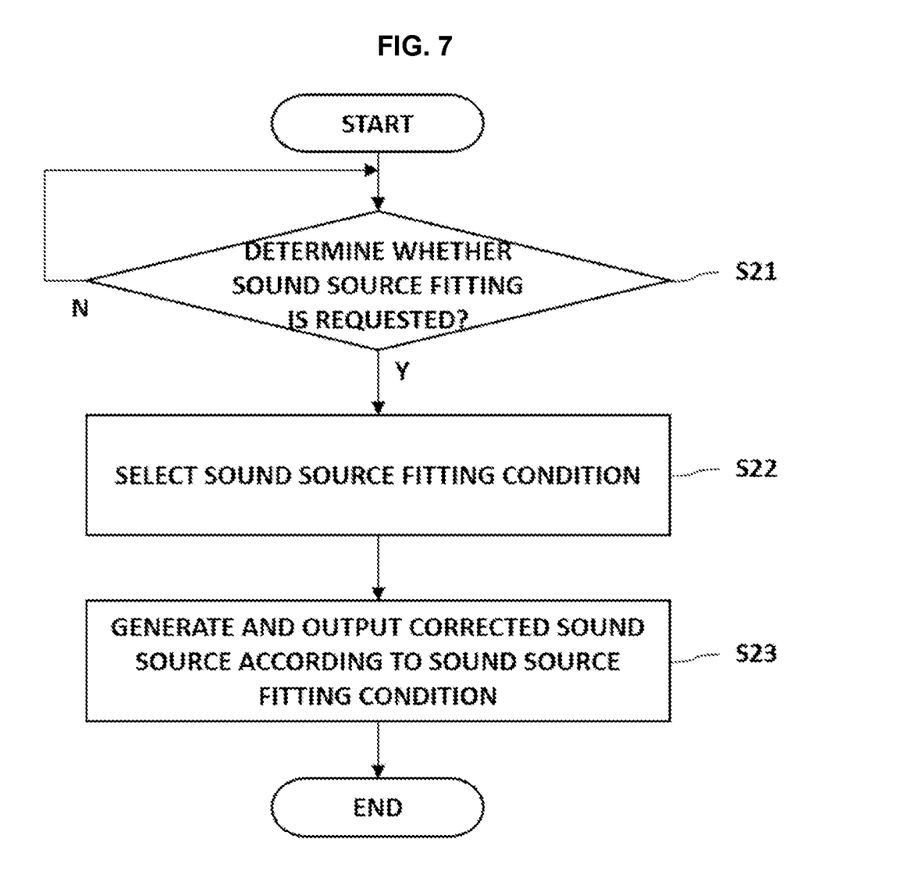
FIGS. 7 and 8 are diagrams for describing a method of fitting a sound source, according to an embodiment of the present disclosure.
Figure 8:
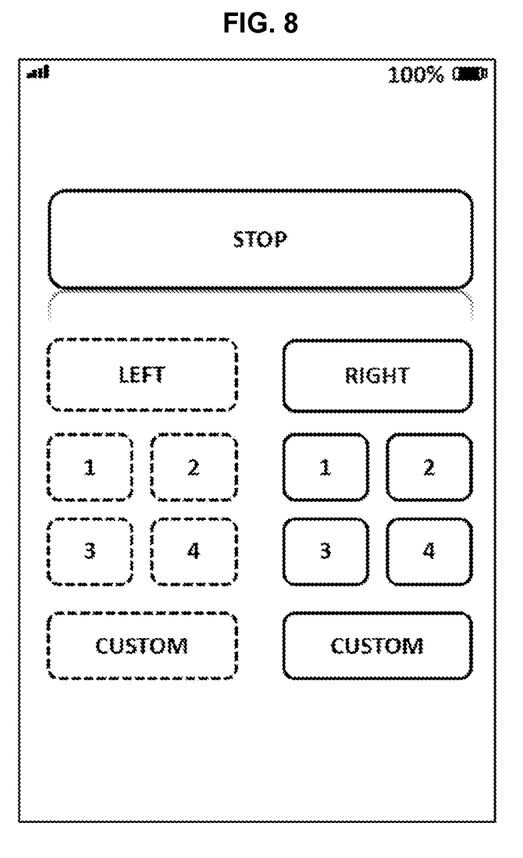

FIGS. 7 and 8 are diagrams for describing a method of fitting a sound source, according to an embodiment of the present disclosure.

First, when a user requests sound source fitting (S21), a screen for selecting sound source fitting conditions of the left ear and the right ear is configured and provided as shown in FIG. 8. In particular, according to the present disclosure, four pre-set fitting conditions 1 through 4 in addition to a user-customized fitting condition CUSTOM corresponding to a user hearing threshold may be additionally selected, thereby increasing the user's selection range.

Accordingly, when the user selects sound source fitting conditions corresponding to the left ear and the right ear (S22), an input sound source is converted into a corrected sound source and is output by applying the sound source fitting conditions (S23).

As described above, a mobile terminal includes therein the mobile sensor 270 configured to sense and notify a user position, a user ambient illuminance, and a user motion.

Accordingly, an application of the present disclosure may automatically recognize a user situation based on a sensing result of the mobile sensor 270, and may set and apply differently according to a sound source fitting condition for each user situation.

Figure 9:
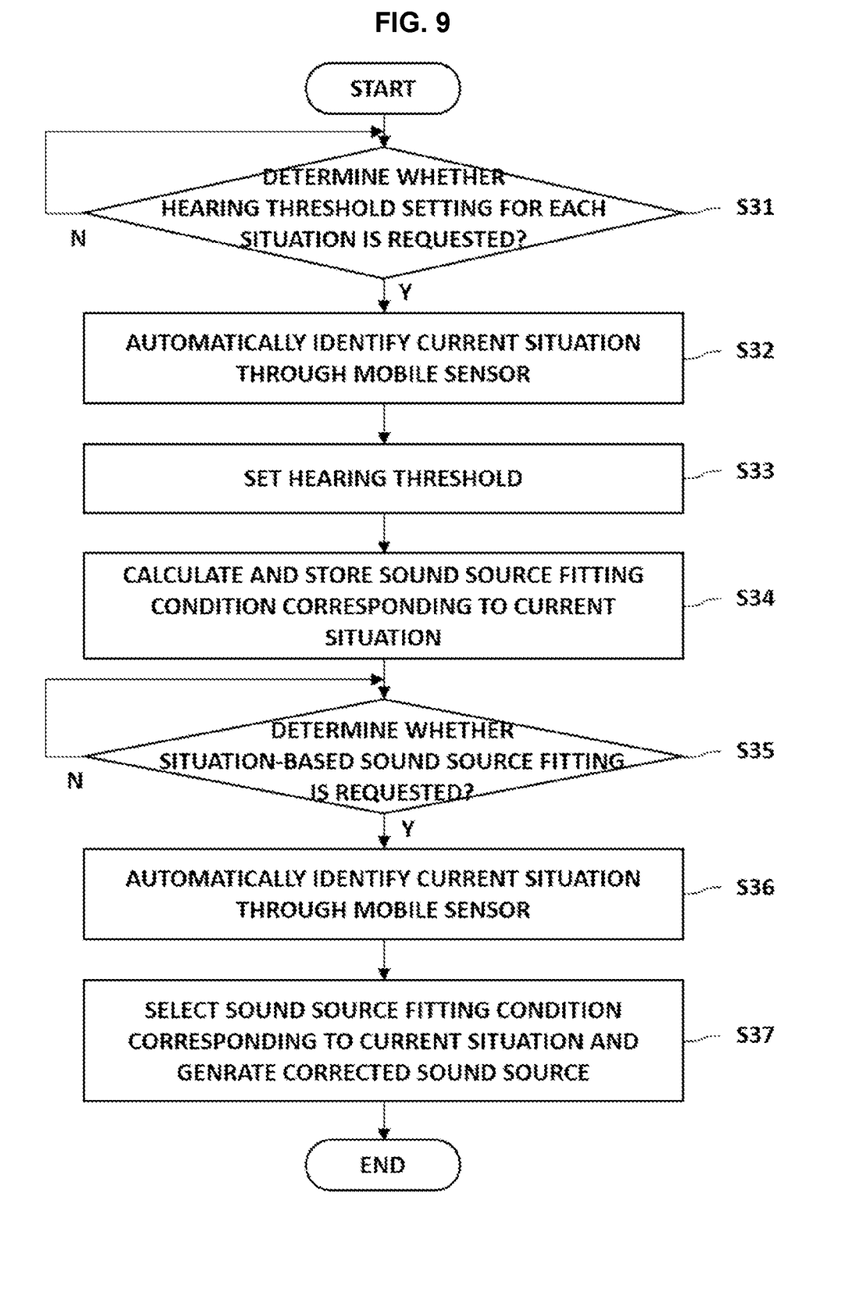
FIG. 9 is a diagram for describing a method of setting a hearing threshold and fitting a sound source, according to another embodiment of the present disclosure.

FIG. 9 is a diagram for describing a method of setting a hearing threshold and fitting a sound source, according to another embodiment of the present disclosure.

First, when a user requests hearing threshold setting for each situation (S31), the hearing threshold setter 252 of the hearing aid application is interoperated with the mobile sensor 270 to automatically identify a current user situation by receiving and analyzing at least one of a current user position, a user ambient illuminance, and a user motion (S32).

The above-described hearing test screen is configured and provided, so that the user sets a hearing threshold optimized for the current situation (S33), and a sound source fitting condition corresponding to the current situation is calculated and stored based on the hearing threshold (S34).

Operations S31 through S34 may be repeatedly performed for multiple situations, and thus, a plurality of sound source fitting conditions for the situations may be obtained and stored.

As such, in a state where the sound source fitting conditions according to the situations are set, when the user requests situation-based sound source fitting (S35), the hearing aid application is interoperated with the mobile sensor 270 again to identify a current situation by recognizing and analyzing at least one of a current user position, a user ambient illuminance, and a user motion (S36).

An input sound source is converted into a corrected sound source and output, by searching and selecting a sound source fitting condition corresponding to the current situation (S37).

As such, according to the present disclosure, a user situation may be automatically identified by using mobile resources, and a sound source fitting condition for each user situation may be set and applied, thereby making it possible for a user to receive a corrected sound source optimized for a current situation.

That is, by considering that an actually perceived level may vary according to the user's situation even when the hearing threshold of the user is the same, a sound source fitting condition may be differently applied for each user situation.

For example, when the user divides the office as a first situation and the home as a second situation and then separately sets sound source fitting conditions corresponding to the first and second situations, while the user is located in the office, a corrected source may be generated and provided according to the sound source fitting condition corresponding to the first situation, and while the user is located in the home, a corrected sound source may be generated and provided according to the sound source fitting condition corresponding to the second situation.

Accordingly, a user situation may be automatically identified through a mobile sensor of a mobile terminal, thereby minimizing user intervention for recognizing the user situation.

The method according to the present embodiment may be embodied as a program executed in a computer and may be stored in a computer-readable recording medium, and examples of the computer-readable recording medium include read-only memories (ROMs), random-access memories (RAMs), compact disc (CD)-ROMs, magnetic tapes, floppy disks, optical data storage devices, and carrier waves (e.g., data transmission through the Internet).

The computer-readable recording medium may be distributed among computer systems that are interconnected through a network so that computer-readable code is stored and executed in a distributed fashion. Functional programs, code, and code segments for embodying the method may be easily derived by programmers in the technical field to which the present disclosure pertains.

In addition, although the embodiments of the present disclosure have been illustrated and described above, the present disclosure is not limited to the above-described specific embodiments. Various modified embodiments may be made by one of ordinary skill in the art without departing from the scope of the present disclosure as claimed in the claims, and these modifications should not be individually understood from the technical spirit or the prospect of the present disclosure.

What is claimed is:

1. A mobile terminal comprising:
a microphone configured to obtain and provide an input sound source;
an earphone connection module configured to support connection and communication with an earphone; and
a hearing aid application configured to set a sound source fitting condition corresponding to a user hearing threshold, convert the input sound source obtained through the microphone into a corrected sound source according to the sound source fitting condition, and then output the corrected sound source to the earphone,
wherein the hearing aid application comprises:
an earphone connection detector configured to detect and notify whether the earphone is connected;
a hearing threshold setter configured to determine a hearing threshold by tracking and monitoring a user response while varying a sound pressure for each frequency channel of a hearing test sound;
a sound source fitter configured to calculate and store a user-customized fitting condition corresponding to the hearing threshold, divide the input sound source into n frequency channels, and generate and output the corrected sound source by nonlinearly compressing and amplifying each of the n frequency channels according to the user-customized fitting condition;
an ambient noise canceler configured to remove ambient noise included in the input sound source; and
a feedback canceler configured to remove feedback noise included in the input sound source.

2. The mobile terminal of claim 1, wherein the hearing threshold setter is further configured to receive and store a hearing threshold manually input from a user.

3. The mobile terminal of claim 1, wherein the sound source fitter is further configured to pre-set and store a plurality of fitting conditions having pre-set values, and then generate and output the corrected sound source through any one of the plurality of fitting conditions with a user's consent.

4. The mobile terminal of claim 1, wherein the hearing threshold setter is further configured to identify a user situation by interoperating with a mobile sensor, and then obtain and set a hearing threshold corresponding to each user situation.

5. The mobile terminal of claim 4, wherein the sound source fitter is further configured to obtain and store a sound source fitting condition for each situation based on the hearing threshold corresponding to each user situation, automatically identify a user situation by interoperating with the mobile sensor, and then generate and provide the corrected sound source by automatically selecting and applying a sound source fitting condition corresponding to the user situation.

6. An earphone-based hearing aid system comprising:
an earphone; and
a mobile terminal comprising a hearing aid application installed and executed to set a sound source fitting condition corresponding to a user hearing threshold, convert an input sound source obtained through a microphone into a corrected sound source according to the sound source fitting condition, and output the corrected sound source to the earphone,
wherein the hearing aid application comprises:
an earphone connection detector configured to detect and notify whether the earphone is connected;
a hearing threshold setter configured to determine a hearing threshold by tracking and monitoring a user response while varying a sound pressure for each frequency channel of a hearing test sound;
a sound source fitter configured to calculate and store a user-customized fitting condition corresponding to the hearing threshold, divide the input sound source into n frequency channels, and generate and output the corrected sound source by nonlinearly compressing and amplifying each of the n frequency channels according to the user-customized fitting condition;
an ambient noise canceler configured to remove ambient noise included in the input sound source; and
a feedback canceler configured to remove feedback noise included in the input sound source.

* * * * *